United States Patent
Platz et al.

[11] Patent Number: 5,771,319
[45] Date of Patent: Jun. 23, 1998

[54] NETWORK FOR INFLUENCING SIGNAL FIELDS

[75] Inventors: Willy Platz, Munich; Helmut Riedel, Fuerstenfeldbruck; Gerald Sobotta, Sauerlach, all of Germany

[73] Assignee: Daimler-Benz Aerospace AG, Germany

[21] Appl. No.: 705,716

[22] Filed: Aug. 30, 1996

[51] Int. Cl.[6] .............................. H04N 1/409; H03F 1/26; H03F 1/34
[52] U.S. Cl. .............................. 382/275; 358/463; 330/84; 330/149
[58] Field of Search .................................. 382/275, 254; 358/463; 330/84, 149, 124 R, 295

[56] References Cited

FOREIGN PATENT DOCUMENTS 19527079  7/1995  Germany .................. H04N 1/409

*Primary Examiner*—Scott Rogers
*Attorney, Agent, or Firm*—Evenson, McKeown, Edwards & Lenahan P.L.L.C.

[57] ABSTRACT

The invention relates to analog circuits which are constructed as fed-back amplifier networks. The networking is implemented such that the output values of the individual amplifier elements are fed back to the input values of the respective adjacent amplifier elements. The degree of feedback can be statically and dynamically adjusted according to the specific application. Two-dimensional networks with such an architecture can be used, for example, in image processing for the interference reduction under real-time conditions.

5 Claims, 5 Drawing Sheets

BLOCK DIAGRAM OF AN INTERFERENCE REDUCTION CIRCUIT FOR ONE-DIMENSIONAL SIGNAL FIELDS

BLOCK DIAGRAM OF A TWO-DIMENSIONAL INTERFERENCE
REDUCTION NETWORK

COUPLINGS FOR THE INTERFERENCE REDUCTION IN A
TWO-DIMENSIONAL SIGNAL FIELD IN IMAGE TAKING
DEVICES WITH SQUARE PIXELS

COUPLINGS FOR THE INTERFERENCE REDUCTION IN A
TWO-DIMENSIONAL SIGNAL FIELD IN IMAGE TAKING
DEVICES WITH HEXAGONAL PIXELS

COUPLINGS FOR THE INTERFERENCE REDUCTION IN A
TWO-DIMENSIONAL SIGNAL FIELD IN IMAGE TAKING
DEVICES WITH TRIANGULAR PIXELS

NETWORK FOR INFLUENCING SIGNAL FIELDS

SHORT DESCRIPTION OF THE INVENTION

The invention relates to analog circuits which are constructed as fed-back amplifier networks. The networking is implemented such that the output values of the individual amplifier elements are fed back to the input values of the respective adjacent amplifier elements. The degree of feedback can be statically and dynamically adjusted according to the specific application. Two-dimensional networks with such an architecture can be used, for example, in image processing for the interference reduction under real-time conditions.

STATE OF THE ART

The object of reducing interference from data of signal fields based on the model is a complex mathematical task which cannot be satisfactorily achieved by means of digital computers under production-oriented master conditions (low computer volume, low energy consumption, real-time capacity). For solving this problem, parallel-processing analog networks are provided which can be implemented as monolithically integrated circuits.

Previously discussed analog networks, as they are used, for example, for processing the data of binary images, are suitable for a practical application only to a limited extent because, as a result of their conceptual formulation, they are suitable only for faultless binary images. A reliable processing of image data with systematic and statistical faults requires a double network in which an interference reduction network is connected in front of the data processing network. In order to be able to support specific preferred directions within the image, an anisotropy of the interference reduction process is required. So far, no analog networks (or integrated circuits) are known in image processing which carry out a model-based anisotropic interference reduction for binary images in real time.

OBJECT ON WHICH THE INVENTION IS BASED

The invention is therefore based on the object of developing a process for the model-based anisotropic interference reduction of two-dimensional signal fields. The implementation of this process is to be demonstrated in an analog circuit. This analog circuit must be capable of being monolithically integrated and must be suitable also for the real-time interference reduction of more complex fields with a larger number of elements (for example, 256×256).

DETAILED DESCRIPTION OF THE INVENTION

Figure 1:
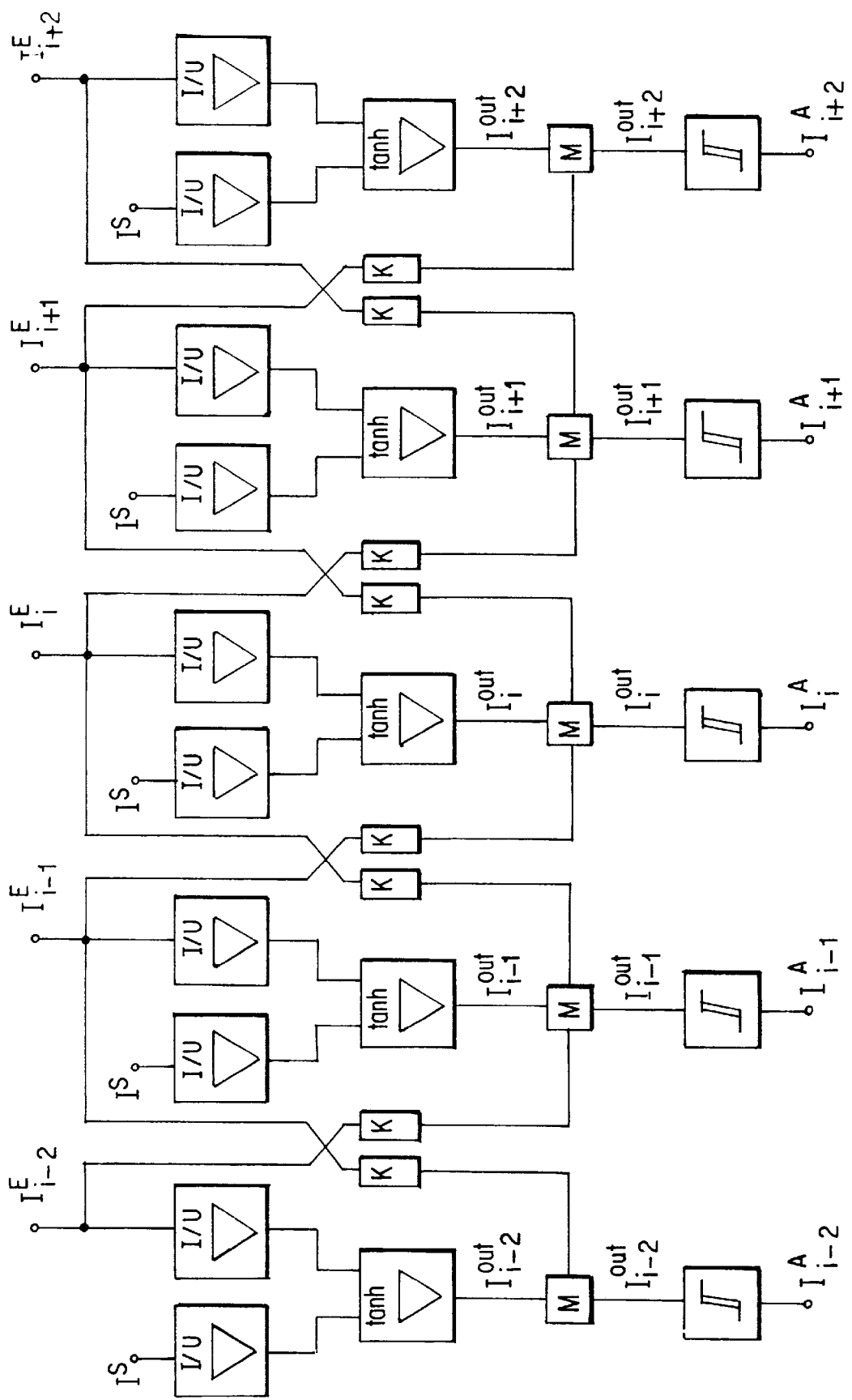
Figure 2:
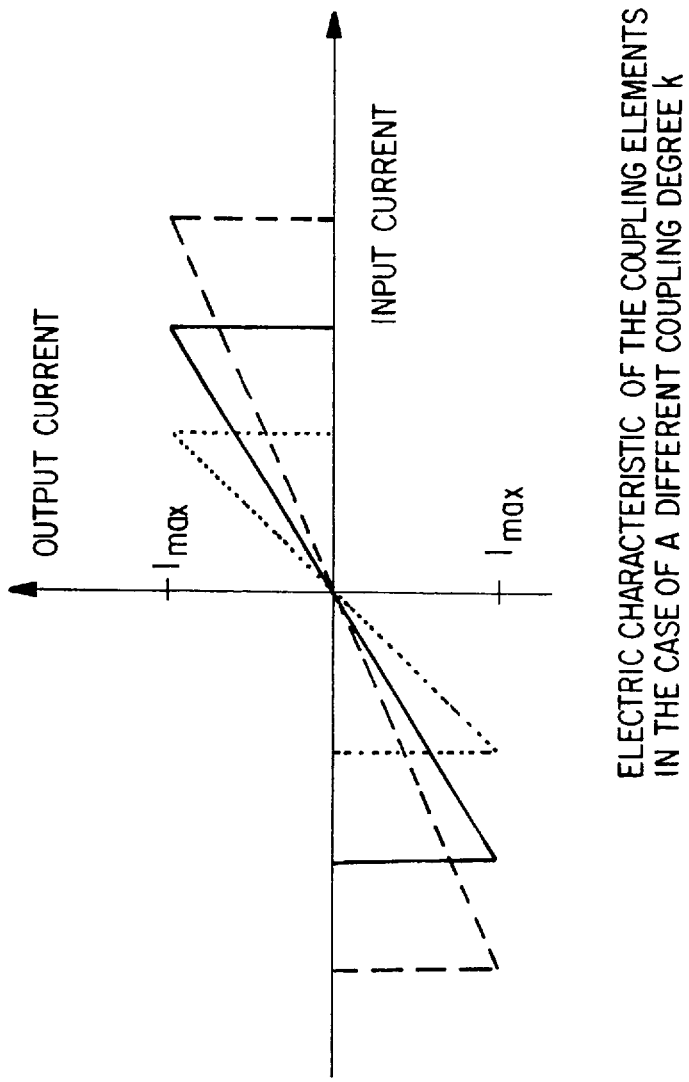
Figure 3:
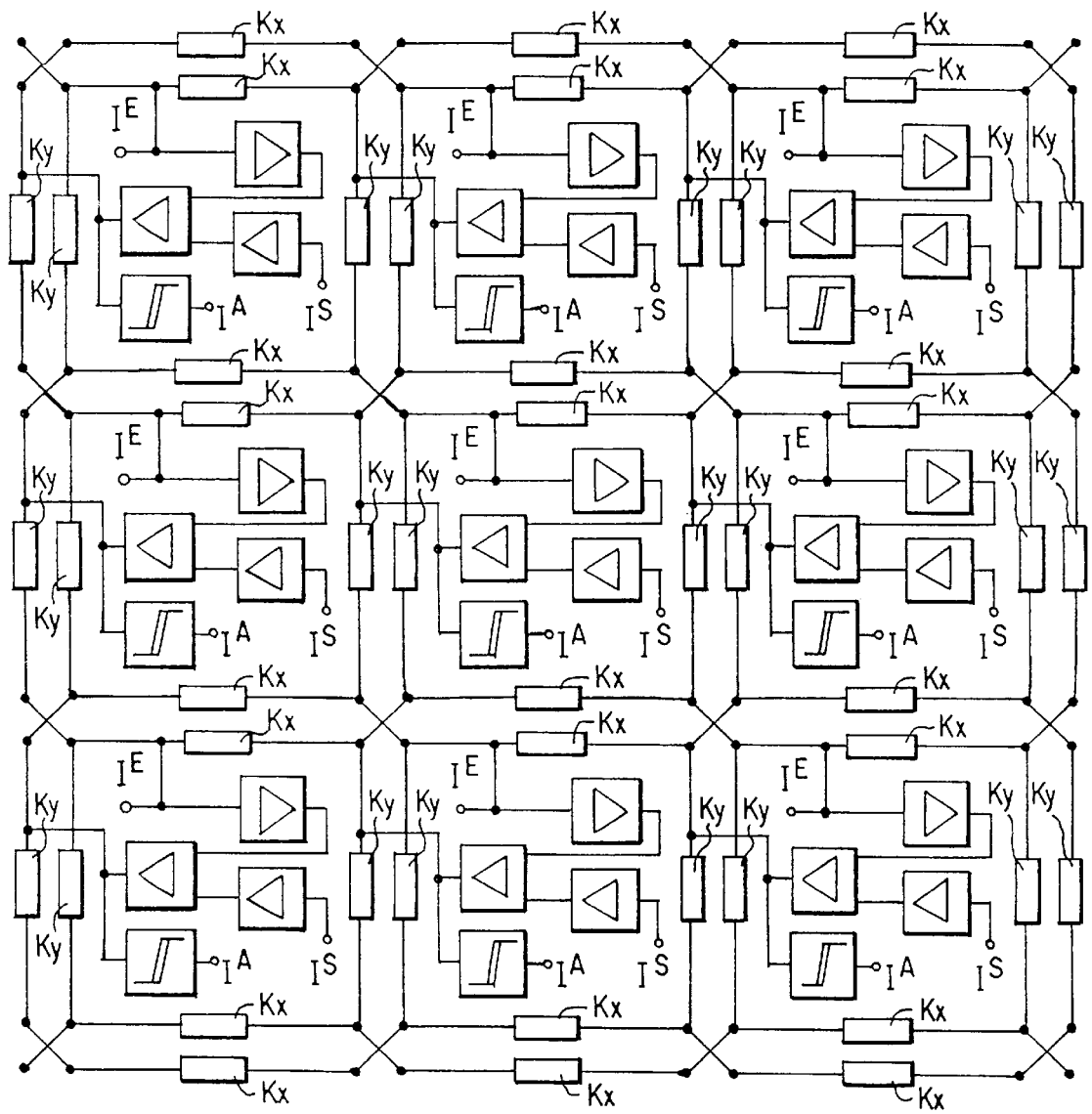
Figure 4:
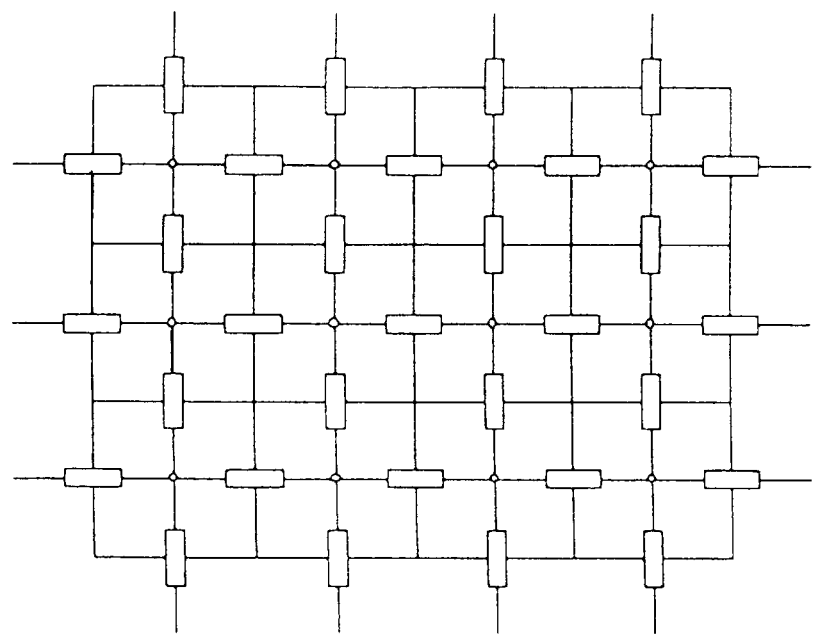
Figure 5:
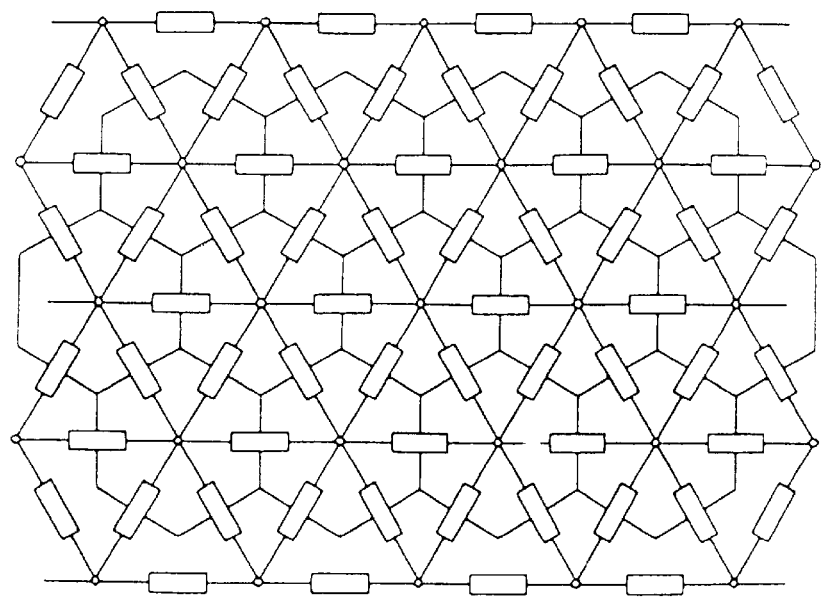
Figure 6:
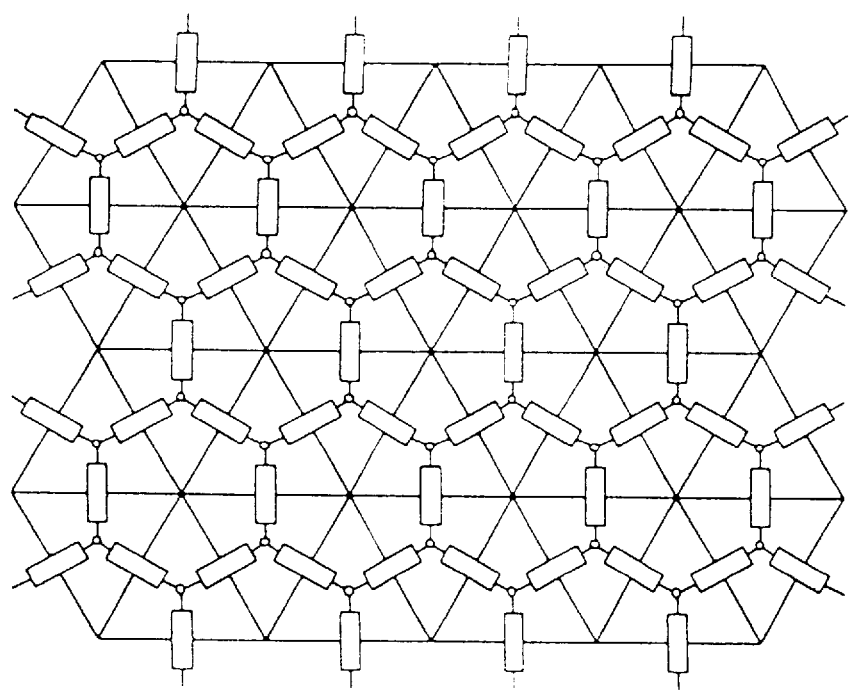

Interference reduction networks for binary images (for example, interference reduction of edge images) were described in earlier works (compare Chr. Koch, J. Marroquin and A. Yuille, *Proc. Natl. Head. Sci.*, USA, Vol. 38, pp. 4263–4267, June 1986 *Biophysics*. In contrast to these networks designed for quadratically organized pixel grids, alternative networks were developed for different grid structures (compare Patent Application DE 195 27 079.7 of Jul. 25, 1995).

An example of an analog circuit which can be used for the implementation of an interference reduction process according to the present invention is shown in Illustration 1 for a one-dimensional signal field. In the simplest case, the required circuit components are limited to amplifier elements, current mirrors and threshold value switches.

A line-shaped arrangement of amplifier elements is fed with input signals (currents) $I_i^E$. In addition, by way of coupling elements K (for example, by way of current mirrors), a portion of the output signals $kI_{i-1}^{out}$ and $KI_{i+1}^{out}$ of the two respective adjacent amplifier elements is superimposed on each input signal. The degree of coupling k of the elements which reflects the portion of the fed back current can be freely adjusted in this case. By means of current mirrors M, the output signals $I_i^{out}$ of the amplifier elements are imaged on three identical signals respectively. As a result, it is avoided that the input current of the coupling elements falsifies the signals $I_i^{out}$.

The difference of the respective superimposed input signals with respect to an adjustable current threshold $I^S$ will be amplified subsequently. In this case, the amplifier characteristic is to have a linear range which, with an increasing difference of the two signal inputs, changes into a saturation range of the output signal. While the circuit-related expenditures are low, this can be achieved, for example, by means of a transconductance operational amplifier, with a hyperbolic tangent (tanh) characteristic. However, in order to be able to use a transconductance operational amplifier, a preceding current/voltage transformation of the input signals and of the current threshold is required.

As an alternative to the transconductance operational amplifier, other amplifier elements can be used as long as they contain a signal-limiting function in the case of larger differences of the input signals and have a hyperbolic-tangent-like (tanh-like) characteristic.

A discrete-rendering device (threshold value switch) which has an adjustable switching threshold is connected to the output of each of these signal-limiting hyperbolic-tangent (tanh) amplifiers. By means of this discrete-rendering device, the value-continuous output signals $I_i^{out}$ can be converted into discrete (digital) current values $I_i^A$.

This circuit is based on the following process:

The field $I^E$ contains input data from a one-dimensional signal field. In these case, the values of the individual input signals are in the interval $[-I^E_{max}, +I^E_{max}]$. In a standardized representation, this interval contains the value range $-1 \leq I_i^E \leq +1$. The transformation factor a of the amplifier elements which are used for the current/voltage transformation transforms the input currents $I_i^E$ and the current threshold I into corresponding voltage values:

$$U_i^E = \alpha I_i^E \qquad (1)$$

$$U^S = \alpha I^S \qquad (2)$$

The amplifier elements connected behind the current/voltage transformers will subsequently carry out a U/I-transformation with a tanh characteristic and therefore supply output signals $I_i^{out}$ in the interval $[-I^{out}_{max}, +I^{out}_{max}]$. For the standardization, the voltage signals to be amplified are applied to the value of the thermal voltage UT and are weighted by means of an ideality factor $k (0 \leq k \leq 1)$.

$$U_T = \frac{k_E T}{e} \qquad (3)$$

($k_E$: Boltzmann's constant; e: elementary charge unit)

The coupled network in Illustration 1 therefore solves the system of equations:

$$I_i^{out} = I_{max}^{out} \tanh\left(\alpha \frac{\kappa e}{k_B T} (kI_{i-1}^{out} + kI_{i+1}^{out} + I_i^E - I^S)\right) \quad (4)$$

The value of k reflects the coupling between adjacent elements and therefore represents the degree of interference reduction of the analog circuit. A strong feedback of the output signals to the input signals of adjacent elements; that is, in the present embodiment, the feedback of current portions of the output signals by way of current mirrors, results in a high degree of interference reduction of the original signal field. If, inversely, only a small portion of the respective output signals is fed back, the interference of the original signal field is reduced only slightly. For interference reduction takes place for systematic as well as for statistical faults.

The interference-reduced analog values of the output currents $I_i^{out}$ can be led out for a further processing. By means of discrete-rendering elements (threshold value switches) which follow, these analog values can be imaged on digital current values $I_i^A$, in which case the interference reduction process can be additionally controlled by the selection of the switching threshold of these discrete-rendering elements. Finally, a binary output data field with reduced interferences is obtained. In the case of digital input data $I_i^E$, a further processing of the digital output values is advantageous.

When simple current mirrors are used, the value range of the coupling degree k amounts to:

$$0 \leq k \leq 1 \quad (5)$$

If the current mirrors are constructed by means of higher circuit-related expenditures as an adjustable current amplifier, the adjusting range of the coupling degree can be additionally expanded as follows:

$$-1 \leq k \leq +1 \quad (6)$$

A characteristic feature of the coupling elements is the fact that they carry out the feedback of output signals to input signals without impairing the output signals. In the simplest case, a current $I_i^{out}$ is measured by means of a current mirror and is multiplied with the coupling degree k before it is fed back to the adjacent amplifier element. Generalized, the coupling elements represent controllable current sources which can be switched off and which can be controlled statically as well as dynamically and supply output currents $I_{source}$ in the following range:

$$I_{source} = kI_i^{out} \quad (7)$$

The electric characteristic of these elements is shown in Illustration 2.

The use of such controllable sources, particularly the utilization of the switch-off characteristic, permits the local change of coherence lengths within the processed signal fields. A local adaptation is very advantageous, among other things, in the image processing for segmenting applications.

Switching concepts using a coupling of signal outputs and signal inputs by means of controlled current sources offer considerable advantages in comparison to concepts with so-called "switchable resistors" or "fuses", as suggested, for example, in C. Mead, "Analog VLSI and Neural Systems:, *Addison-Wesley*, 1989). Since the controlled current sources do not impair the individual signal outputs, by means of this switching technique, fed-back systems can be implemented whose output-input relations cannot be achieved by means of switchable resistors.

In a simple manner, the described process can be expanded to the interference reduction of two-dimensional signal fields with lines and columns (such as halftone images). For this purpose, the circuit arrangement described in Illustration 1 is changed into an analog circuit according to Illustration 3. In this case, the formal relationships for the input and output data expand as follows for a line and column representation ij:

Field $I^E$ now contains the input data of the lines and columns of a two-dimensional signal field. Also in the two-dimensional case, the value range of the individual field elements $I_{ij}^E$ amounts to $-1 \leq I_{ij}^E \leq +1$.

Thus, the two-dimensionally coupled network in Illustration 3 solves the system of equations:

$$I_{i,j}^{out} = \quad (8)$$

$$I_{max}^{out} \tanh\left(\alpha \frac{\kappa e}{k_B T} (k_x I_{i-1,j}^{out} + k_x I_{i+1,j}^{out} + k_y I_{i,j-1}^{out} + k_y I_{i,j+1}^{out} + I_{i,j}^E - I^S)\right)$$

Also here, the parameters $I^{out}_{max}$, k and $\alpha$ determine the amplifier characteristic of the tanh amplifiers, whereas $k_x$ and $k_y$ can assume different values in the two-dimensional case.

The following applies to the value range of $k_x$ and $k_y$:

$$-1 \leq k_x \leq +1 \quad (9)$$

$$-1 \leq k_y \leq +1 \quad (10)$$

The selection of values $k_x$ and $k_y$ determines the interference reduction action. A strong coupling (large value for $k_x$ and $k_y$) determines a high degree of interference reduction of the basic image in both axial directions x and y, while a weaker coupling has little influence on the original image data. If different values are selected for $k_x$ and $k_y$, different degrees of interference reduction for the respective axial directions can be achieved within one image. If a high degree of interference reduction is required in the x-direction, $k_x$ is selected to be large and $k_y$ is selected to be small. Correspondingly, $k_x$ is small and $k_y$ is large if the interference reduction is to be stronger in the y-direction. Such an anisotropy can be utilized, for example, in the image processing for the interference reduction of object edges with specific preferred directions. Furthermore, the two factors $k_x$ and $k_y$ can be made locally dependent on the segmenting. Thus, the interference reduction is also possible along given edges.

Illustration 3 shows the expansion of the arrangement in Illustration 1 to a two-dimensional network. Also only amplifiers, current mirrors and threshold value switches are required as circuit elements. In the illustrated topology, the coupling elements $K_x$ and $K_y$ can be arranged very regularly so that a compact construction is achieved as the result of the high degree of symmetry of the circuit. The monolithic integration of such a circuit therefore permits the processing of complex signal fields.

Two-dimensional signal fields may be based on different grids. The described process provides an interference reduction of such signal fields also for non-orthogonal grids. This can be demonstrated on the example of image processing applications. In the simplest case, the image data of an image taking device organized in lines and columns are processed. If the described signal coupling for the reduction of image interference is constructed according to the principle of "closest neighbors", in such an orthogonal square-type grid, the coupling elements corresponding to Illustration 4 also form a square-type grid. In contrast, for further applications, couplings can also be used which produce a linking of the "next-but-one neighbors". In addition, by way of multiplexer circuits, the couplings can also be designed to be dynamically changeable according to given patterns.

In the following illustrations, the coupling elements which lead from one grid point to the respective neighbor and those which feed signals back from the neighbors are in each case combined in a single symbol.

In the case of a hexagonally organized structure of image taking devices with hexagonal pixels, a grid structure according to Illustration 5 is obtained. The coupling elements are situated on a triangle-type grid.

As another application, Illustration 6 shows an image taking device with triangular pixels. Here, the arrangement of the coupling elements also takes place on a triangle-type grid.

Analogous to the processing of current signals, the described circuit can naturally also be designed by means of a suitable transformation for the processing of input data in the form of voltage signals. In this case, the controlled current sources can be wired as controlled voltage sources. The construction of the overall circuit will depend on the possibilities of the manufacturing technology. If, for example, an implementation is to take place in CMOS-technology, the use of current signals offers advantages.

We claim:

1. Network for influencing signals fields, particularly for the application in electronic image processing, consisting of a plurality of amplifier circuits regularly arranged in an area-type manner, a respective separate amplifier circuit with a signal input ($I^E$) receiving the signal and a signal output ($I^{out}$) being assigned to each signal of the signal field, and, in addition, each signal output by way of coupling elements with an adjustable degree of coupling (k) being fed back to the inputs of the respective adjacent amplifier circuits.

2. Network according to claim 1, characterized in that current mirror circuits (M) are used as coupling elements.

3. Network according to claim 1 or 2, characterized in that the amplifier circuits have amplifier elements with a tanh characteristic.

4. Network according to one of the preceding claims, characterized in that, in the amplifier circuits on the input side, the difference of the signal present at the respective signal input and of an adjustable signal threshold is formed and is in each case supplied to an amplifier element.

5. Network according to one of the preceding claims, characterized in that one threshold value switch respectively is arranged behind the signal output.

* * * * *